(12) United States Patent
Zhao et al.

(10) Patent No.: US 6,741,926 B1
(45) Date of Patent: May 25, 2004

(54) METHOD AND SYSTEM FOR REPORTING AUTOMOTIVE TRAFFIC CONDITIONS IN RESPONSE TO USER-SPECIFIC REQUESTS

(75) Inventors: Wei Zhao, Alpharetta, GA (US); Lara F. Morgan, Norcross, GA (US); Michael A. Oblon, Rockville, MD (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 196 days.

(21) Appl. No.: 10/004,500

(22) Filed: Dec. 6, 2001

(51) Int. Cl.[7] .............................................. G01C 21/00
(52) U.S. Cl. ...................................................... 701/201
(58) Field of Search ................................ 701/201, 213, 701/117, 209, 210, 211; 340/995.13; 342/357.06, 357.09, 357.1

(56) References Cited

U.S. PATENT DOCUMENTS

| | | | | |
|---|---|---|---|---|
| 4,812,843 A | * | 3/1989 | Champion et al. ........... 340/905 |
| 5,752,186 A | * | 5/1998 | Malackowski et al. .. 455/414.1 |
| 5,774,827 A | * | 6/1998 | Smith et al. ................. 701/209 |
| 5,959,577 A | * | 9/1999 | Fan et al. ............... 342/357.13 |
| 6,029,069 A | * | 2/2000 | Takaki ...................... 455/456.1 |
| 6,253,146 B1 | * | 6/2001 | Hanson et al. ............... 701/202 |
| 6,266,615 B1 | * | 7/2001 | Jin .............................. 701/213 |
| 6,411,220 B1 | * | 6/2002 | Davis et al. ................. 340/905 |
| 6,456,234 B1 | * | 9/2002 | Johnson .................. 342/357.09 |
| 6,466,862 B1 | * | 10/2002 | DeKock et al. ............. 701/117 |
| 6,490,521 B2 | * | 12/2002 | Wiener ........................ 701/211 |
| 6,584,401 B2 | * | 6/2003 | Kirshenbaum et al. ..... 701/202 |
| 2002/0152020 A1 | * | 10/2002 | Seibel ......................... 701/208 |

OTHER PUBLICATIONS www.traffic.com, "Welcome to Traffic.com", Apr. 4, 2001.

\* cited by examiner

*Primary Examiner*—Michael J. Zanelli
(74) *Attorney, Agent, or Firm*—Shaw Pittman LLP

(57) ABSTRACT

The method and system described herein provides an interface for accessing a database containing information pertaining traffic conditions. Using the interface, a driver can receive traffic conditions potentially affecting the driver's particular commute, just prior to the time at which the driver chooses between one or more routes for the commute. Several embodiments are disclosed in accordance with the present invention by which the driver can easily receive timely traffic information from the interface via driver's wireless communications device, such as a wireless telephone.

32 Claims, 18 Drawing Sheets

FIG. 4

| ROUTE | STREET | STRETCH OF ROAD | DISTANCE |
|---|---|---|---|
| (A) | (1) | Rt 23 N, b/t 1st & A Sts., | 3 mi |
|  | (2) | A St. W, b/t Rt 23 N & G St., | 6 mi |
|  | (3) | G St. S, b/t A St. & J St., | 1 mi |
|  | (4) | J St. SW, b/t G St. & 2nd St. | 2 mi |
|  | (5) | 2nd St. NW, b/t J St. & Hwy 350 | 0.5 mi |
|  | (6) | Hwy 350 N, b/t J St. & Hwy 350 | 5 mi |
| (B) | (1) | Rt 23 N, b/t 1st & 2nd Sts. | 0.5 mi |
|  | (2) | 2nd St. W, b/t Rt 23N & Hwy 350 | 6 mi |
|  | (3) | Hwy 350 N, b/t Rt 23N & Hwy 350 | 5 mi |
| (C) | (1) | Rt 23 S, b/t 2nd & 1st Sts. | .5 mi |
|  | (2) | 1st St. W, b/t Rt 23 & I-87 | 2 mi |
|  | (3) | I-187 SW, b/t 1st St. & I-95 | 2 mi |
|  | (4) | I-95 NW, b/t I-87 & G St. | 6 mi |
|  | (4) | G St. N, b/t I-95 & 22nd St. | 1 mi |
|  | (5) | 22nd St. W, b/t G St. & Hwy 350 | 3 mi |
|  | (6) | Hwy 350 N, b/t G St. & Hwy 350 | 10 mi |

FIG. 5

|   | List of Streets in Route | Mi. | Average MPH | # of Traffic Lights | Traffic Advisory/Category | Estimated MPH | Traffic light timing | Time |
|---|---|---|---|---|---|---|---|---|
| (A) (1) | Rt 23 N, b/t 1st & A Sts., | 3 mi | 45 mph | 1 | None | 45 mph | +1 min | 5 min |
| (2) | A St. W, b/t Rt 23 N & G St., | 6 mi | 45 mph | 0 | Congestion, Category 3 | 25 mph | 0 min | 14 min |
| (3) | G St. S, b/t A St. & J St., | 1 mi | 15 mph | 1 | None | 15 mph | +2 min | 6 min |
| (4) | J St. SW, b/t G St. & 2nd St. | 2 mi | 30 mph | 0 | Congestion, Category 4 | 25 mph | 0 | 4.5 min |
| (5) | 2nd St. NW, b/t J St. & Hwy 350 | 0.5 mi | 15 mph | 1 | Congestion, Category 2 | 8 mph | +1 min | 5 min |
| (6) | Hwy 350 N, b/t J St. & Hwy 350 | 5 mi | 55 mph | 0 | None | 55 mph | 0 | 5.5 min |
| | TOTAL TIME FOR ROUTE "A" = 40 MINUTES | | | | | | | |
| (B) (1) | Rt 23 N, b/t 1st & 2nd Sts. | 0.5 mi | 45 mph | 1 | None | 45 mph | +1 min | 1.5 min |
| (2) | 2nd St. W, b/t Rt 23N & Hwy 350 | 6 mi | 15 mph | 8 | Congestion, Category 4 | 12 mph | +8 min | 38 min |
| (3) | Hwy 350 N, b/t Rt 23N & Hwy 350 | 5 mi | 55 mph | 0 | None | 55 mph | 0 | 5.5 min |
| | TOTAL TIME FOR ROUTE "B" = 45 MINUTES | | | | | | | |
| (C) (1) | Rt 23 S, b/t 2nd & 1st Sts. | .5 mi | 45 mph | 1 | None | 45 mph | +1 min | 2.5 min |
| (2) | 1st St. W, b/t Rt 23 & I-87 | 2 mi | 35 mph | 0 | None | 35 mph | 0 | 3.5 min |
| (3) | I-187 SW, b/t 1st St. & I-95 | 2 mi | 65 mph | 0 | None | 65 mph | 0 | 2.0 min |
| (4) | I-95 NW, b/t I-87 & G St. | 6 mi | 65 mph | 0 | Accident, Category 1 | 8 mph | 0 | 45 min |
| (5) | G St. N, b/t I-95 & 22nd St. | 1 mi | 25 mph | 1 | None | 25 mph | 1 | 3.4 min |
| (6) | 22nd St. W, b/t G St. & Hwy 350 | 3 mi | 50 mph | 0 | None | 50 mph | 0 | 3.6 min |
| (7) | Hwy 350 N, b/t G St. & Hwy 350 | 10 mi | 55 mph | 0 | None | 55 mph | 0 | 5.5 min |
| | TOTAL TIME FOR ROUTE "C" = 65 MINUTES | | | | | | | |

Identify Street:

Identify Name of Street: ___Third Street___

Identify Another Street: ___● Yes   ○ No___

Identify Street:

Identify Name of Street:   Jay Street

Identify Another Street:   ○ Yes   ● No

Fig. 13

SUBSCRIBER DATABASE

CLIENT: JOHN DOE
DIRECTORY NUMBER: (404) 555-1325
INFORMATION REPORTING FORMAT: SMS

| | |
|---|---|
| 1. | STREET: HALLOWELL DRIVE, NORTH<br>LOCATION: BETWEEN 3$^{RD}$ & 5$^{TH}$ STS.<br>TIME: 12:00 PM<br>DAYS OF WEEK: SATURDAY |
| 2. | ROUTE: ALONG CHERRY VALLEY<br>STREETS: (1) RT 23 N, B/T 1$^{ST}$ & A STS., 3 MI<br>         (2) A ST. W, B/T RT 23 N & G ST., 6 MI<br>         (3) G ST. S, B/T A ST. & J STS., 1 MI<br>         (4) 2$^{ND}$ ST. NW, B/T J ST. & S STS., 5 MI<br>TIME: 8:00 AM<br>DAYS OF WEEK: WEEKDAYS<br>COMPARE WITH: "ALONG HIGHWAY" |
| 3. | ROUTE: ALONG HIGHWAY<br>STREETS: (1) I-395, B/T EXIT 35 & EXIT 47, 10 MI<br>         (2) BACKLICK ROAD, B/T I-395 & _____ RD, 3 MI<br>TIME: 8:00 AM<br>DAYS OF WEEK: WEEKDAYS<br>COMPARE WITH: "ALONG CHERRY VALLEY" |

FIGURE 15

| | TIME/DAY | SUBSCRIBER NO./NAME | ROUTE/ STREET | INFO |
|---|---|---|---|---|
| 1. | 8:00 AM, MONDAY | 555-1212/JOE | ROUTE | A  HIGHWAY  FOX  B = "ALONG HIGHWAY" A  CHERRY VALLEY  FOX  B = "ALONG CHERRY VALLEY" |
| 2. | 11:00 AM, MONDAY | 650-1324/SARAH | STREET | FOX STREET, B/T HIGHWAY & B |
| 3. | 3:30 PM, MONDAY | 924-3526/TONY | ROUTE | C  FOX  B = "BY FOX" C  HIGHWAY  D  FOX  B = "DETOUR" |
| 4. | 5:00 AM, TUESDAY | 999-1234/SAM | STREET | HIGHWAY, B/T A & C |
| 5. | 8:00 AM, TUESDAY | 555-1212/JOE | ROUTE | A  HIGHWAY  FOX  B = "ALONG HIGHWAY" A  CHERRY VALLEY  FOX  B = "ALONG CHERRY VALLEY" |
| . | . | . | . | . |
| 6. | 12:00 PM, SATURDAY | 999-1234/SAM | STREET | HIGHWAY, B/T A & C |
| . | . | . | . | . |

METHOD AND SYSTEM FOR REPORTING AUTOMOTIVE TRAFFIC CONDITIONS IN RESPONSE TO USER-SPECIFIC REQUESTS

FIELD OF THE INVENTION

The present invention relates to automotive traffic tracking systems, and more particularly, to a system for providing automotive traffic reports based upon requests for specific traffic information.

BACKGROUND INFORMATION

Over the past decade, automobile traffic has become an increasing by severe problem in many cities, affecting employees' productivity and quality of life. The amount of traffic congestion that occurs on any particular road at any given time may vary dramatically on each day, due to unpredictable variables including traffic accidents or road construction. If a commuter is unaware of the traffic conditions until he has become delayed in traffic, it is then too late to plan a viable alternative route. Despite attempts to avoid traffic by altering work schedules and experimenting with different routes, most commuters continue to experience intolerable traffic, often on a regular basis.

Although there are several resources that are presently available to provide drivers with traffic information, none is effective for enabling drivers to easily obtain the information in time to avoid unpredictable traffic congestion while en route. For example, traffic reports that are broadcast over local radio stations typically provide driving conditions only at periodic intervals, and only for certain major highways. As another example, computerized, overhead traffic message displays that are located on some major roads or highways are usually not very useful because drivers are not given sufficient advanced notice to divert traffic to alternative routes. While radio traffic reports and programmable signs can provide useful information, these resources cannot be customized to provide information on demand for each individual driver's commute, and therefore have only a limited effect.

Recently, Internet web sites have been created for providing traffic information concerning specific roadways in certain metropolitan areas. The traffic information that is provided on such web sites is retrieved from databases containing traffic information that is periodically updated at regular intervals. Traffic.com, Inc. operates a web site for providing traffic information for several major routes in certain metropolitan areas. The web site provides color-coded maps that illustrate the traffic conditions along several major roadways in metropolitan areas. Using a "keyroute summary," the web site also indicates, for several major routes, the average speed of traffic and whether there are any traffic advisories on the routes. As another example, a web site operated by The Washington Post enables a user to select or "click on" one of several roadways on a map of the Washington, D.C. metropolitan area and receive a short written report concerning traffic conditions for the selected roadway.

While web sites may provide accurate traffic conditions from databases of traffic information, many drivers either do not have access to the Internet or otherwise do not wish to access the Internet from their home or office before beginning a commute. In either case, since traffic information changes constantly, the information that one obtains from a web site may no longer be accurate during the time that the user is driving. Although it is possible to access information from a web page while in transit, for example, via in-vehicle computer systems or personal digital assistants, this is difficult and sometimes unsafe to do while driving, and such systems can be quite expensive.

Accordingly, there is a need for systems that enable drivers to easily access traffic information while commuting.

SUMMARY OF THE INVENTION

The present invention relates to methods and systems for accessing a traffic conditions database to receive specific traffic information in response to users' requests. In one embodiment of the present invention, a driver can call an administrative telephone number and contact an operator who specializes in providing traffic information for a certain metropolitan area. The driver provides a present location and a destination location to the operator. The operator then accesses a computerized traffic database and determines the most efficient route for the driver to take at that time, and communicates this information to the driver.

In a second embodiment, a driver pre-configures a traffic predicting system by first providing information concerning the driver's typical destinations and the driver's preferred routes for reaching these destinations. This information can be entered into a database in accordance with a web-based program. While en route, the driver can then call an administrative telephone number with a wireless telephone, and interact with a voice-automated system to indicate the driver's intended destination. The automated system then accesses a computerized traffic database and determines which of the driver's preferred routes will allow the driver reach the destination in the least amount of time. The preferred route is reported to the driver in the format of a short audio message on the driver's wireless telephone.

In a third embodiment, the driver pre-configures a traffic predicting system by providing information identifying the driver's preferred routes for reaching a destination, and the typical range of times when the driver is commuting. The information stored in the database is associated with the driver's wireless telephone number. This embodiment uses the Short Messaging Service (SMS) to provide short messages over the display of the driver's associated wireless telephone during the range of times when the driver is commuting, to advise the driver which of the preferred routes to choose.

It is an object of the present invention to provide a traffic reporting system, including a subscriber database for maintaining subscriber account information including subscriber identification information, and a traffic information database for receiving updates of traffic congestion information and storing the most recently received information. A traffic information interface provides traffic congestion information stored in the traffic information database pertaining to a particular route or street to an identified subscriber, in response to a particular request over a wireless network.

The traffic information interface may be operated by a human intermediary who receives requests for traffic information spoken by subscribers over a wireless network. The traffic information interface may also provide traffic information based upon requests provided through responses to automated prompts by a subscriber using a wireless telephone. The traffic information interface may automatically transmit short text messages to particular subscribers, based upon either the time or the geographical location of each subscriber, where subscribers pre-configure the traffic information interface by providing a list of one or more streets or routes that are of interest to the respective subscribers.

It is another object of the present invention to provide a method for providing traffic congestion information from a traffic database to a subscriber over a wireless network. A telephone call is received from a subscriber's wireless telephone. The telephone directory number of the wireless telephone is detected, and it is determined whether the call is from a subscriber. If the call is from a subscriber, the subscriber's present and intended destination locations to request traffic information are received. The most efficient route to travel between the locations is then calculated, based upon traffic information stored in a traffic database.

It is a further object of the present invention to provide a method for providing traffic congestion information after receiving a subscriber's responses to one or more automated prompts. An initial and destination location is retrieved from a subscriber database based upon the subscriber's responses. A most efficient route to travel between the locations is then calculated, based upon traffic information stored in a traffic database. The subscriber pre-configures the subscriber database by performing the steps of entering a wireless directory telephone number, entering a starting and destination location, identifying at least two routes to travel between the locations, and identifying a code name for each route.

It is yet another object of the present invention to provide a method for providing traffic congestion information by identifying a portion of a roadway based upon a subscriber's responses to a series of automated prompts and information stored in a subscriber database. Traffic congestion information for the portion of the roadway is retrieved based upon information maintained in a traffic database. The subscriber pre-configures the subscriber database by performing the steps of entering a wireless directory telephone number, selecting a portion of a roadway, and identifying a code or name for the portion of the roadway.

Another object of the present invention is to provide a method for providing traffic congestion information from a traffic database to a subscriber over a wireless network at a predetermined time. After determining that a subscriber requested traffic information at a present time, an indication of the traffic information requested by the subscriber is retrieved from a subscriber database. The requested traffic information is then retrieved from a traffic database. A short text message is then transmitted to the subscriber's wireless telephone providing requested traffic information.

BRIEF DESCRIPTION OF THE DRAWINGS

FIG. 4 is a list of streets and distances for each possible route illustrated in FIG. 3.

FIG. 5 illustrates a calculation of the shortest route between two locations among the routes illustrated in FIG. 3.

FIG. 13 is an exemplary illustration of information stored in the subscriber database in FIG. 1, after a subscriber pre-configures the traffic predicting system according to FIG. 12.

FIG. 15 is a schematic of a scheduling database that is accessed by the traffic data processors 10 in FIG. 1 to schedule the transmission of text messages to subscribers' wireless devices, in accordance with the third embodiment of the present invention.

DETAILED DESCRIPTION OF THE INVENTION

The method and system described herein provides a system for accessing a database containing information pertaining to traffic conditions. Using the system, a driver can receive traffic conditions potentially affecting the driver's particular commute, just prior to the time at which the driver chooses between one or more routes for the commute. Several embodiments are disclosed in accordance with the present invention by which the driver can easily receive timely traffic information from the system via the driver's wireless communications device, such as a wireless telephone.

Figure 1:
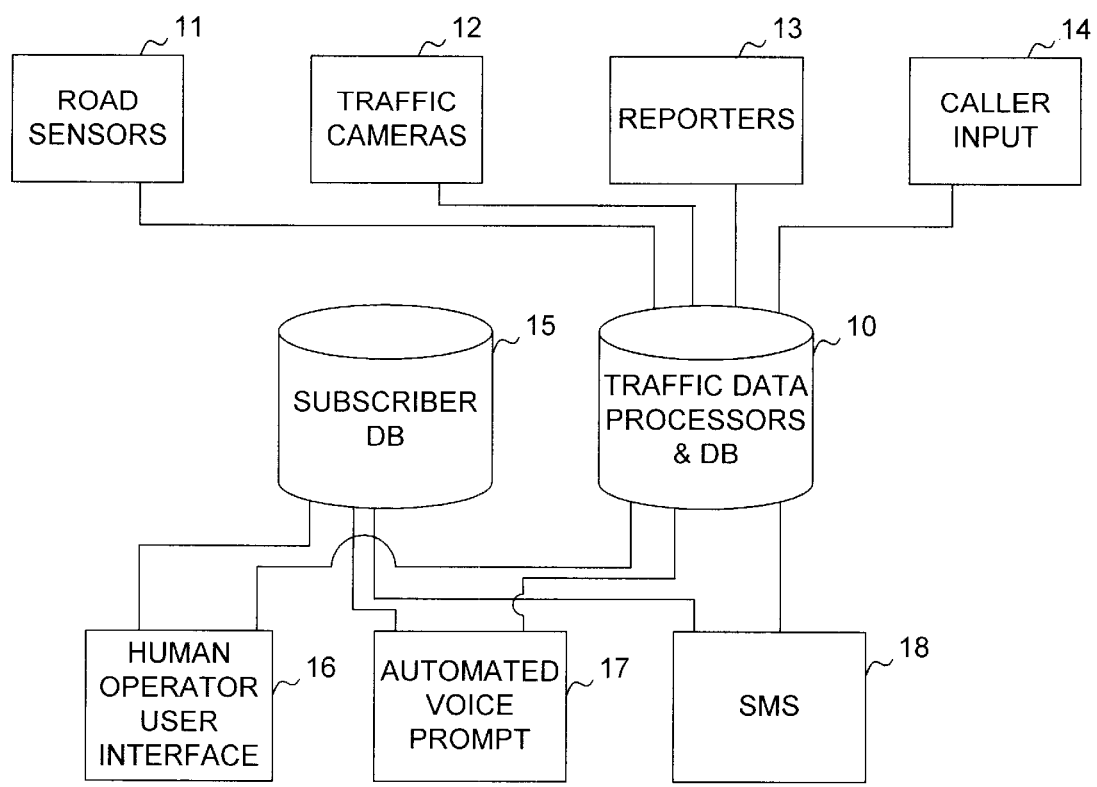
FIG. 1 is a schematic diagram of an exemplary traffic reporting system according to the present invention.

FIG. 1 is a schematic diagram of a traffic condition reporting system according to the present invention for providing traffic conditions to a driver. Traffic data processors and databases 10 receive and maintain traffic data for certain roads and highways in or nearby one or more metropolitan areas. The traffic information can be sorted and organized in the database according to particular stretches along a road (e.g., "Lincoln Drive between $1^{st}$ and $5^{th}$ Streets"), although the information may instead be organized differently without departing from the scope of the invention. For each entry, the database may store one or more fields of traffic information, such as an average speed of traffic (e.g., "20 mph"), advisories of traffic conditions (e.g., "all lanes open" or "traffic accident"), a code indicating the "driveability" of the road (e.g., a rating of 1–5, where 5 indicates that traffic is flowing smoothly), or a code indicating the "driveability" of the road in comparison with the typical traffic conditions on the road at that time (e.g., a rating of 1–5, where 5 indicates a typical traffic pattern for the road). Other such types of information may include the number of traffic lights within the given stretch of road, and for each traffic light, the number of traffic light cycles until a car can pass through the intersection. There are many possible formats for storing traffic data to enable users to quickly learn the severity of traffic conditions for a particular route.

Traffic information in the traffic database may be received from one or more of several possible sources. As in the system described in the web site operated by Traffic.com, Inc., the traffic database may collect traffic information from road sensors 11 installed along particular roadways. This information may be reported through direct wireline communications, or through a wireless communications system. Road sensors can detect and report the average speed of traffic at a given location to the traffic database 10. The speed of traffic information may then be processed in traffic processor 10 to determine whether there is a traffic advisory or to calculate the "driveability" as explained above.

Traffic information may also be input to the traffic database in response to images transmitted from traffic cameras 12 along particular roadways. A traffic database operator can monitor the output from traffic cameras and determine the speed of traffic, traffic advisories, or the "driveability" along the road based upon a qualitative determination of the traffic being monitored. As another source of information, the traffic database operator may receive information from traffic reporters 13 (e.g., helicopter traffic reporting services), and populate the traffic database according to reporters' subjective opinions. Although it may be less reliable, many radio traffic reporting services rely upon wireless telephone caller input 14 for relevant traffic information. It may be possible to provide incentives for commuters to provide such information to the traffic database operator (e.g., to receive a discount on traffic reporting service) to increase the reliability of the information. As another possible source for receiving traffic into the traffic database, it may be possible to determine the speed of travel through GPS systems installed in cars. This information could be communicated to the traffic database and sorted according to individuals streets and roads.

A subscriber database 15 maintains account information for each user seeking information from the traffic database 10. Subscriber database 15 may simply maintain a list of cellular telephone numbers for each current subscriber. Depending upon the subscriber plan, the database may also maintain additional information, such as the date and time that the user placed a call to access the traffic database, the format by which the user wishes to receive traffic information, and the streets and directions for certain routes that are often traveled by the subscriber. There are several embodiments of the present invention by which a user can access information maintained in the traffic database, as will now be described.

Three embodiments are described which a user can use to access traffic information stored in traffic database 10. In one embodiment of the present invention, a driver can call an administrative telephone number and contact a human operator via interface 16, who accesses a computerized traffic database and determines the most efficient route for the driver to take in response to the driver's request. In a second embodiment, a driver pre-configures a traffic reporting system by first providing information to a database concerning the driver's typical destinations and the driver's preferred routes for reaching these destinations. While en route, the driver can then call an administrative telephone number with a wireless telephone, and interact with a voice-automated system 17 to describe the driver's intended destination and to receive a short audio message reporting the shortest route. In a third embodiment, the driver also pre-configures the traffic reporting system by providing information identifying the driver's preferred routes for reaching a destination, and the typical range of times when the driver is commuting. While driving, short text messages 18 are provided over the display of the driver's associated wireless telephone during the range of times when the driver is commuting, to advise the driver which of the preferred routes to choose.

Figure 2:
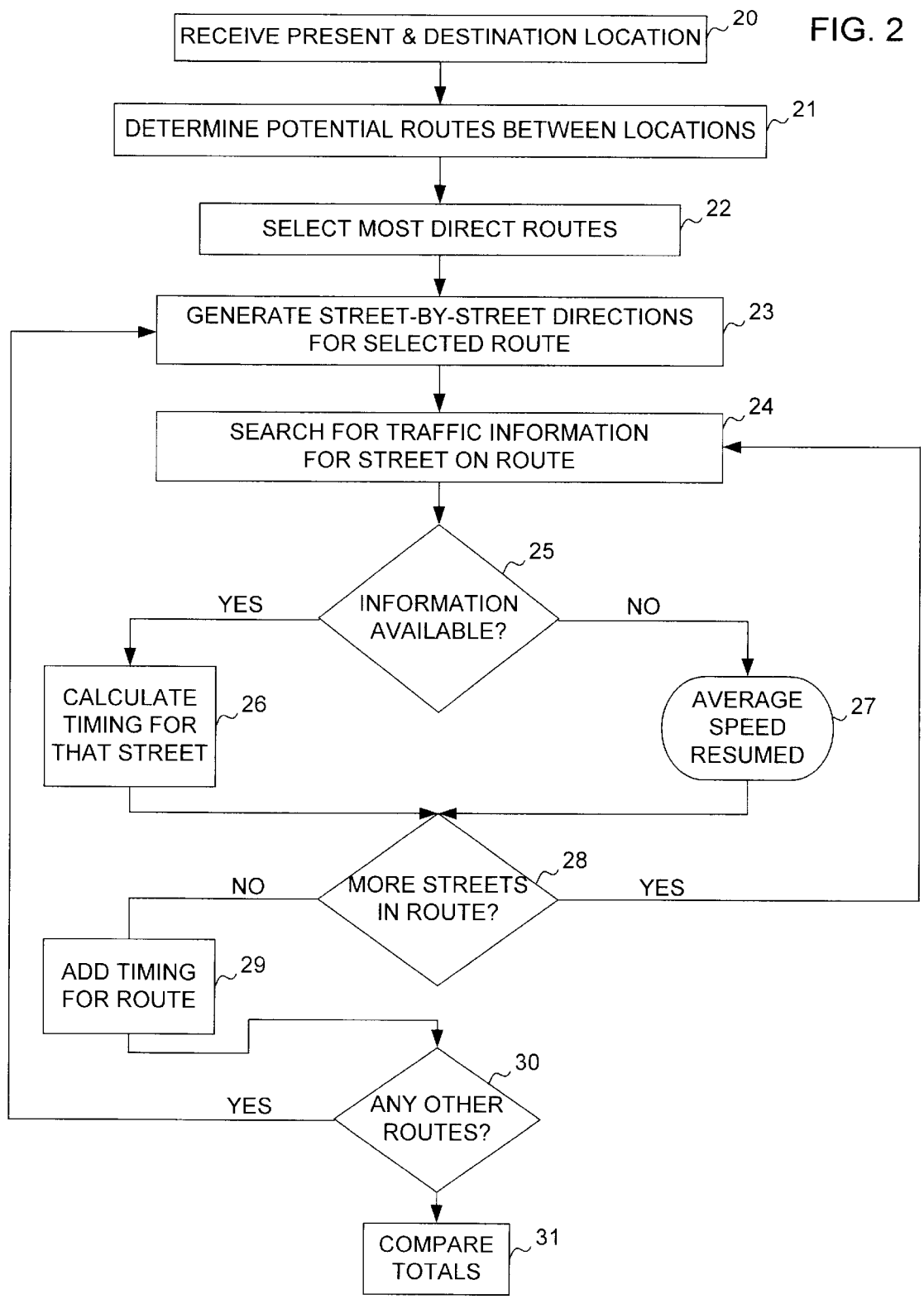
FIG. 2 is an exemplary flow diagram according to the present invention, in which the shortest route between two locations is selected from a plurality of routes according to information stored in a traffic database.
Figure 3:
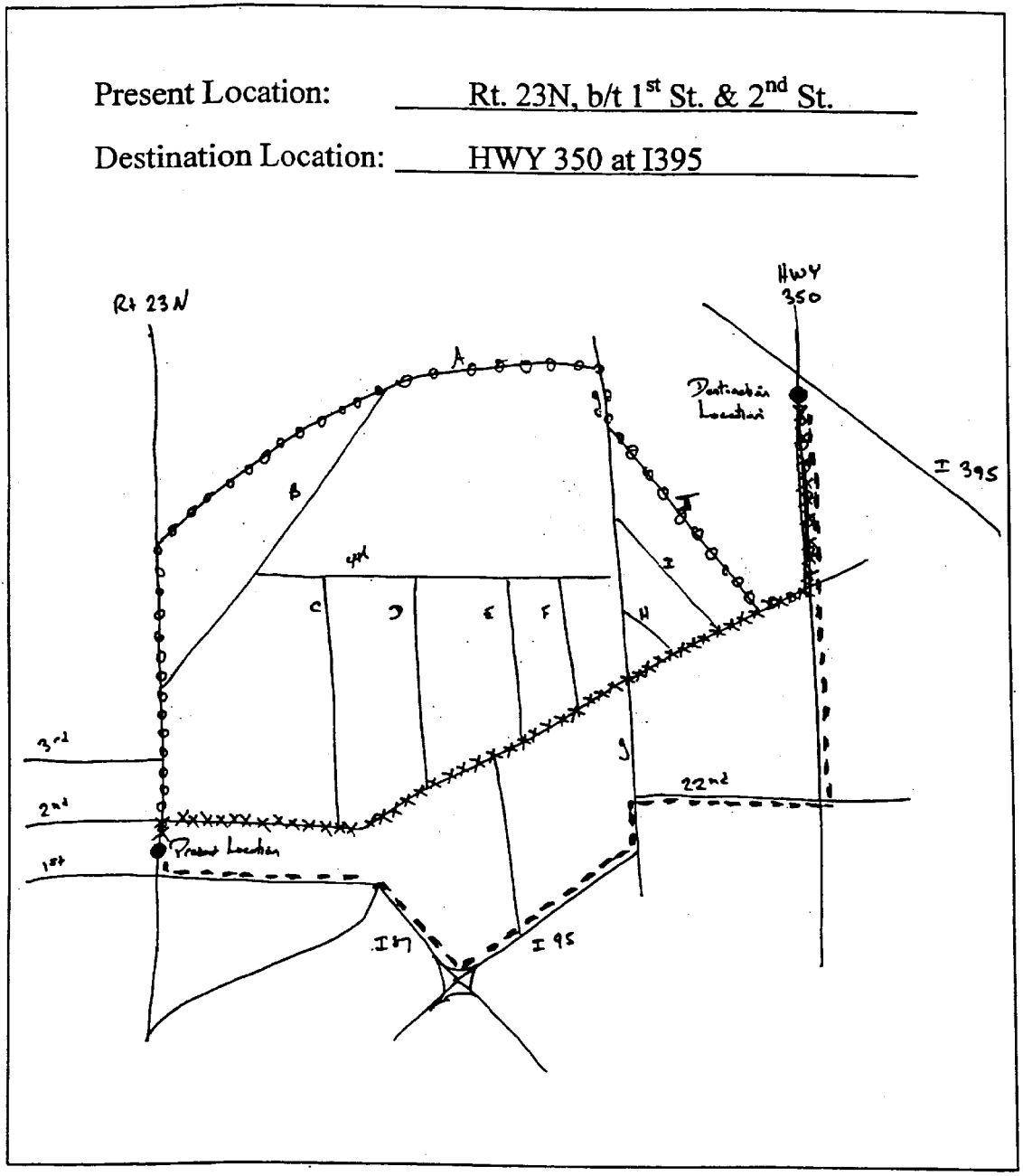
FIG. 3 is an exemplary graphical representation of possible routes as selected by a driver between two locations for a graphical user interface for the traffic reporting system in FIG. 1.

FIG. 2 provides an exemplary flow diagram in which a shortest route between two locations is determined from a plurality of routes by referring to information stored in traffic database 10. In step 20, the driver's present and destination locations are input to a traffic advisory program. Using a mapping program, all potential routes between the two locations can be determined, in step 21. The system can then temporarily select and store a certain number of the most direct routes (e.g., the five (5) most direct routes) in step 22. An example of a graphical representation of the temporarily selected routes is provided in FIG. 3 (all reasonably possible routes would be selected). For each of these selected routes, a list is generated indicating the street-by-street directions (e.g., "(1) Rt. 23 N., b/t $1^{st}$ St. & A St., 3 mi.; (2) A St. W., b/t Rt. 23 & G St., 6 mi.; (3) Fourth St S. b/t A St. & J St., 5 mi, etc.), in step 23. An example of lists for two of the selected routes from FIG. 3 is provided in FIG. 4. As can be seen in FIGS. 3 and 4, although some routes appear to be more direct, these routes may have more cross streets with traffic lights, or may otherwise have traffic advisories.

The traffic advisory program can then determine the shortest of the selected routes by retrieving information from the traffic database. For each route, the system performs a database search, in step 24, and checks for each highway, street, or road in the list to determine if there is any relevant traffic information stored in the database, in step 25. If there is information in the database, it is retrieved and factored into the calculation for determining the shortest route, in step 26. For example, if the traffic database indicates that drivers are only travelling at 20 mph on a particular stretch of the road, and the road is ten miles long, then it will probably take the driver a half hour to traverse that part of the route. As another example, the traffic database may store information indicating that there are five traffic lights along the route, and for each light, it may also store the timing cycle (e.g., number of seconds that the light is "green" and number of seconds that it is "red") and the number of cycles required for a typical driver to pass through the intersection. The traffic advisory program can combine all of this information to determine a length of time for the driver to commute along that route at that particular time. If there is no information in the database, an average speed is presumed, in step 27, which may be based upon the posted speed limit and the typical rate of speed for the road.

After determining that each entry in a list has been checked in the traffic database, in step 28, the traffic advisory program adds the time for each entry to calculate the total time associated with the route, in step 29. The traffic advisory program then checks whether there are any other lists to check, in step 30. Once all lists are checked, a simple comparison of the calculated commuting times can be made, in step 31, to determine which route will allow the shortest commute.

FIG. 5 provides an example of the process for determining the shortest route, based upon the routes illustrated in FIG.

4. As can be seen, for each route, a total time to travel each stretch of road is calculated, incorporating delays for traffic advisories and the number of traffic lights. Although not shown in FIG. 5, it is also possible to factor the timing of each traffic light, which may change during different times of the day, and the number of cycles of the traffic light that occur before a typical driver can travel through the intersection. To calculate the estimated time required to travel each stretch of road, the number of miles to be traveled along the road is divided by the estimated speed of traffic along the road, and this result is added to the number of minutes of anticipated delay resulting from the number of traffic lights. The estimated speed of traffic is determined by subtracting a traffic advisory "factor" from the average speed of traffic on the road. In FIG. 5, the most time efficient route is Route "A," even though other routes are geographically more direct.

After determining the best route, this information can be reported in time for the driver to choose a route to avoid congested roads and congested traffic intersections. The following is a description of three embodiments by which the traffic advisory information can be reported to a driver.

I. Human Intermediary Embodiment

In a first embodiment of the present invention, a subscriber to a traffic monitoring service indirectly accesses the database through a human operator intermediary 16. After determining that the user is a subscriber, the human operator receives a traffic question from the user as a spoken request over the user's wireless telephone. The operator types the request for traffic information into traffic database 10, receives the information, and reports the information back to the user. Using a human intermediary is a relatively easy method for a user to access the database to receive traffic information. The user's local telephone company may provide this service in conjunction with "directory assistance," or the service may be provided by another company that monitors traffic information in the user's metropolitan area.

Figure 6:
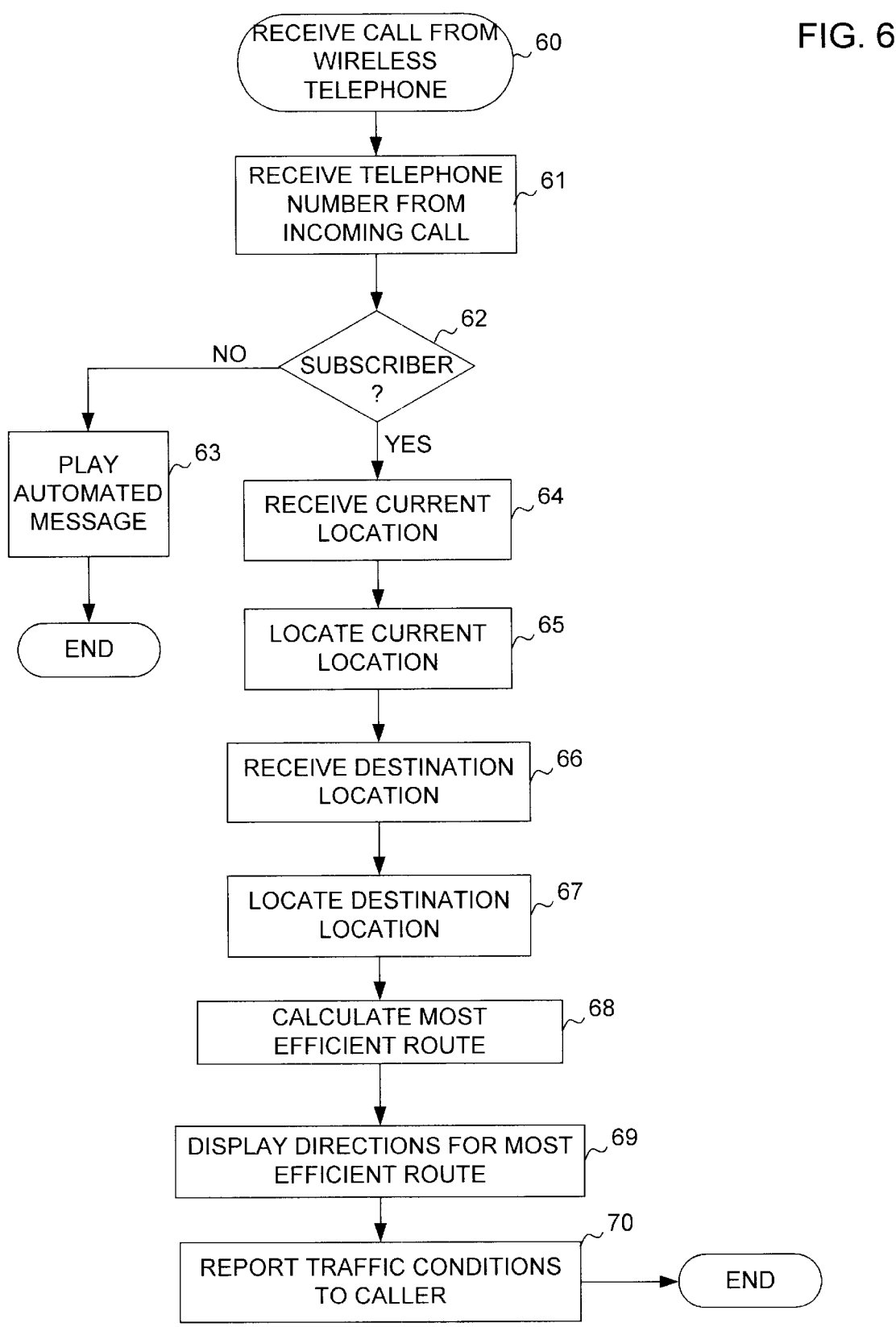
FIG. 6 is a flow diagram illustrating a method for receiving traffic information via a human operator intermediary, according to the first embodiment of the present invention.

FIG. 6 is a flow diagram illustrating a method for receiving traffic information via a human operator intermediary, according to the first embodiment of the present invention. While travelling, but prior to the time that it is necessary to choose between one or two possible routes, a caller dials a telephone number to speak with an operator at a travel advisory service. Upon receiving the call at a human operator station, in step 60, the caller's wireless telephone number is automatically provided (as a "caller ID"), in step 61. This telephone number is checked against a list of current subscribers in the subscriber database to determine whether the caller is a current subscriber, in step 62. If the caller is not a subscriber, an automated message is played, in step 63, and the call is disconnected.

If the caller is a subscriber, the subscriber is prompted, either by a human operator or through an automated voice prompt, to provide the subscriber's present location, and the system receives this information in step 64. This information is entered into a mapping system to locate the subscriber's present location, in step 65. The subscriber is also prompted to provide a destination location and this is received in step 66 and entered into a mapping system to locate the subscriber's intended destination, in step 67. Using speech recognition technology, it is possible to automatically enter this information, if it is provided in a correct format.

In the exemplary implementation, once the subscriber's present and destination location is entered, a program calculates the most time efficient route for the subscriber's commute in step 68, based upon both traffic conditions and mileage. An example of a flow for a traffic advisory program is provided above with reference to FIG. 2. In a more simplified implementation, software can be created that displays a roadmap of the relevant section of the metropolitan region and overlays the two or three shortest possible routes with traffic advisory information for those routes. Based upon this visual description, a human operator may be able to formulate an opinion as to which is the preferred route. This implementation may be particularly useful when the driver is only choosing between two roads (e.g., the highway or the back streets) and only wants to know whether there are any unexpected travel advisories on either of the two roads.

Figure 7:
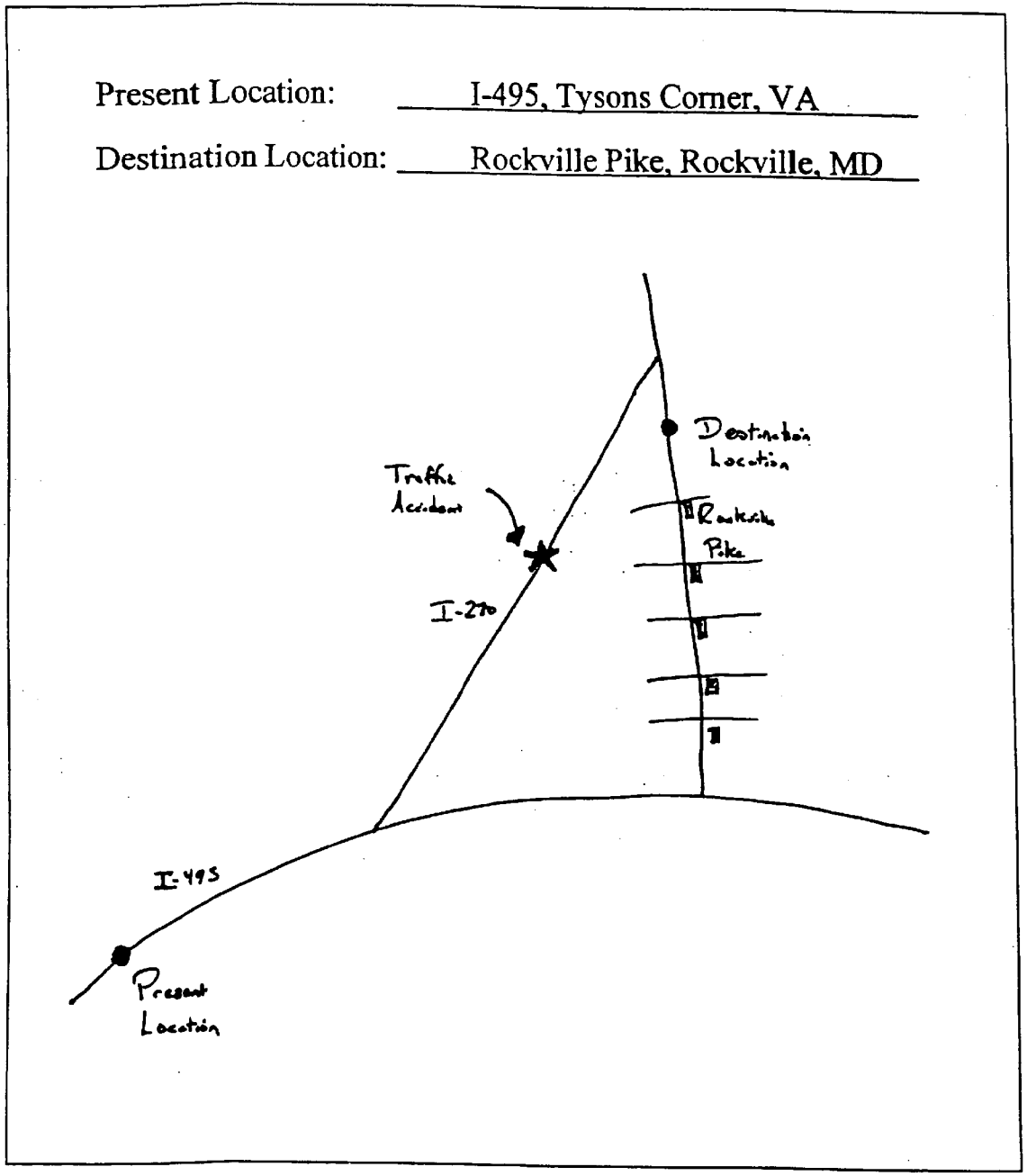
FIG. 7 provides an exemplary map illustrating differences in traffic conditions between two possible routes to the same destination that can be reported to drivers via the first embodiment of the present invention.

FIG. 7 provides an illustration of an example in which a driver could easily benefit from contacting a human intermediary to receive traffic information. In this example, the driver will soon choose whether or not to take a bypass route ("I-270") to travel to his intended destination ("Rockville Pike"). Upon providing this information and accessing the traffic database, an operator can recommend against taking the bypass route due to an accident that recently occurred on a road that is along that route.

II. Pre-programmed Automated Embodiment

In a second embodiment, a driver pre-configures a traffic predicting system by first providing information concerning the driver's typical destinations and the driver's preferred routes for reaching these destinations. This information can be entered into a database in accordance with a web-based program. While en route, the driver can then call an administrative telephone number with a wireless telephone and respond to prompts from a voice-automated system to indicate the driver's intended destination. The automated system then accesses a computerized traffic database and determines which of the driver's preferred routes will allow the driver to reach the destination in the least amount of time. The preferred route is provided as a short audio message on the driver's wireless telephone.

Figure 8:
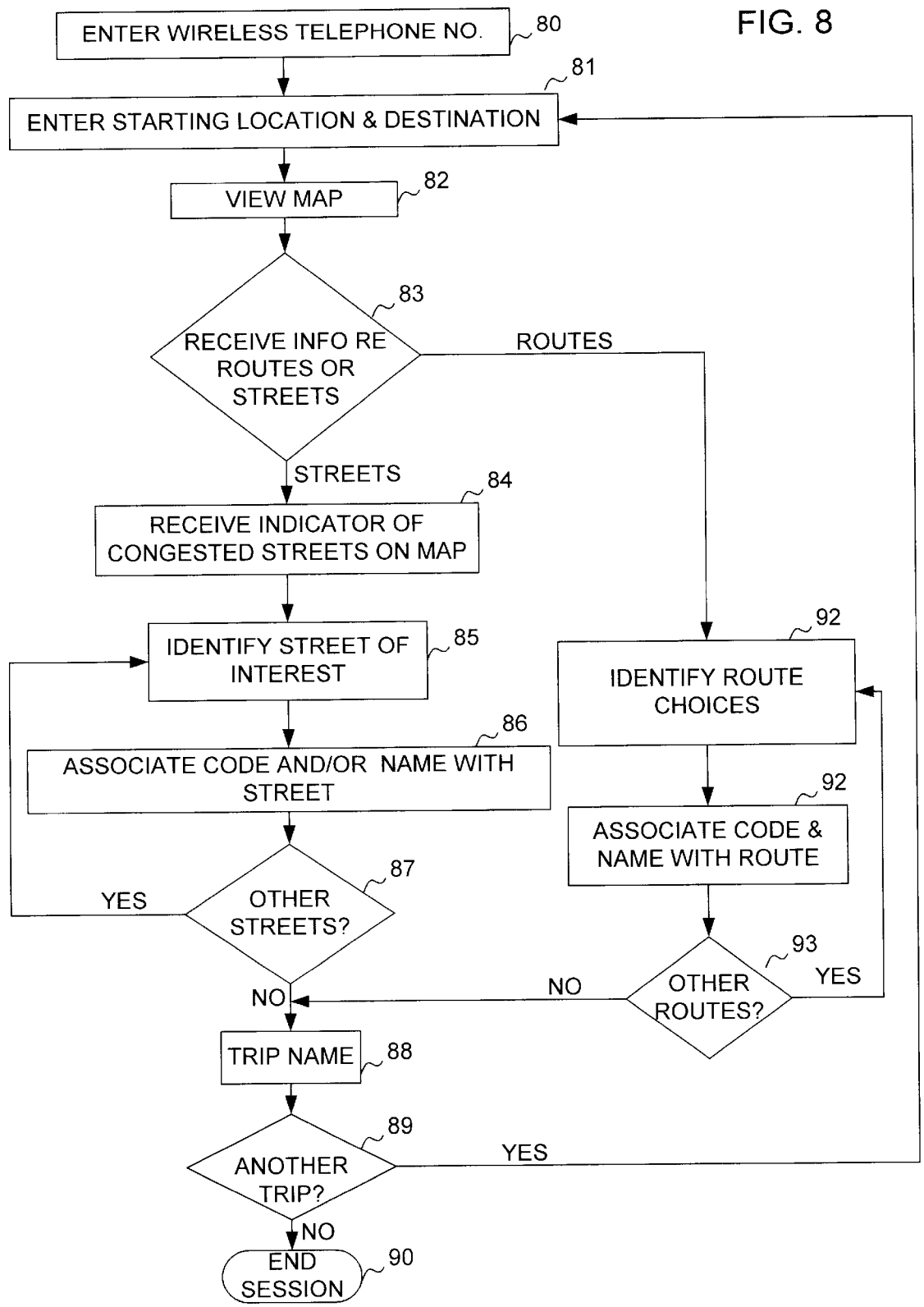
FIG. 8 is a flow diagram illustrating the steps for pre-configuring a traffic predicting system according to a second embodiment of the present invention.

In an exemplary implementation, a driver accesses a web site to subscribe to the traffic monitoring service. The web site enables the driver to pre-configure a subscriber database to provide specific traffic information in response to calls from the subscriber's wireless telephone. FIG. 8 is a flow diagram illustrating the steps for pre-configuring the traffic predicting system according to the pre-programmed embodiment.

The web site requests the driver to first enter a wireless directory telephone number, in step 80. When the driver calls to receive traffic information, this number will be scanned (e.g., by caller-ID) to identify the driver as a subscriber. The driver is also prompted to provide a starting location and a destination location, in step 81. Using this information, the web site generates a roadmap, in step 82, which shows the starting and ending locations and the relevant streets by which the driver may choose to travel. Optionally, the driver may be prompted to enter additional information, such as preferred travel times (both morning and evening).

In the exemplary implementation, the driver can choose in step 84 to either receive information concerning congestion on particular, identified streets, or a recommendation of one particular route from a plurality of possible routes based upon current traffic conditions. If the driver chooses to receive information pertaining to particular streets, an indication of which streets typically experience congestion and are monitored by the service is provided on the road map. Using the graphical interface, the driver identifies the stretches of particular streets that he wishes to monitor (e.g., I-495 between I-270 and Old Georgetown Rd.) in step 85. The driver can then associate a code or a name with this stretch of road (e.g., "beltway" or "1") in step 86. Although not shown in FIG. 8, the system can prompt the driver to refrain from re-using a name or code, or the system can perform a check to determine whether a proposed name or code has previously been used by the driver. Instead of typing in a name or code, the driver may also be able to speak the name into a microphone, which is then digitally recorded for use with a speech recognition system.

The driver can then choose whether to select another road, in step 87. Once the driver has completed selecting roads to monitor, the driver selects a name or code for the trip (e.g., "commute home" or "1"), in step 88, and selects whether to pre-configure monitoring for a different trip, in step 89, and repeat the process.

If, in step 83, the driver elects to receive recommendations from the service of which route to take, the driver identifies a preferred route on the map by selecting stretches of road in the user interface, in step 91. Once the driver identifies the complete route, the driver provides a code or a name for the route (e.g., "highway to work" or "back roads to work") in step 92. The user then selects one or more additional routes in step 93, for the system to compare in determining the quickest route with the minimum traffic.

Figure 9A:
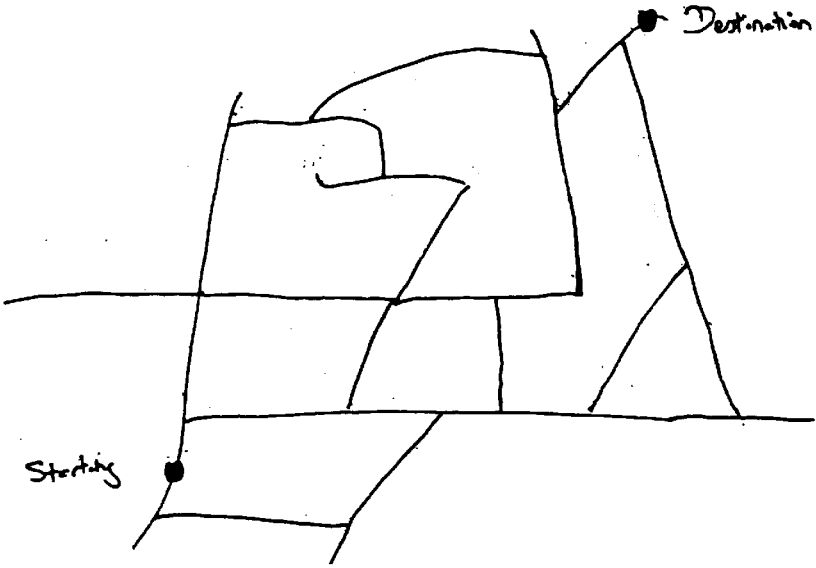
FIGS. 9A–9C are a series of exemplary screen shots for pre-configuring the traffic predicting system by identifying routes in accordance with the flow diagram of FIG. 8.
Figure 9B:
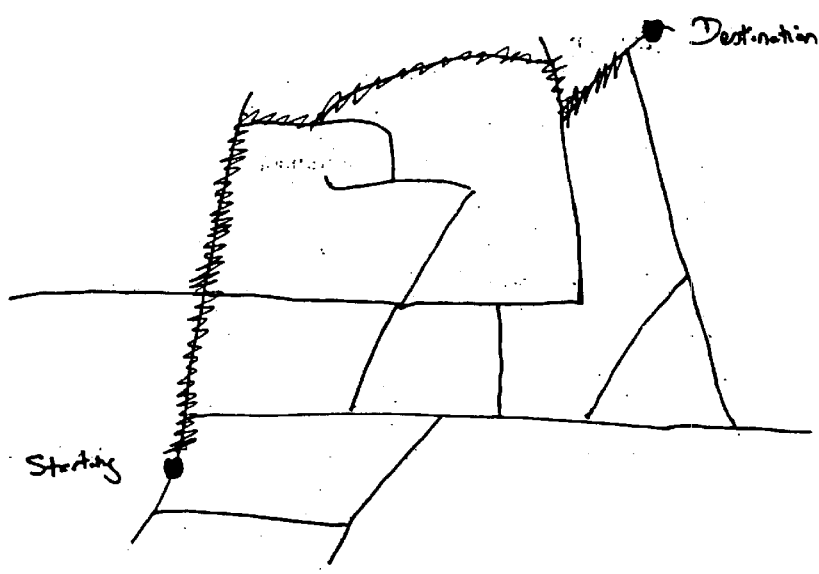
Figure 9C:
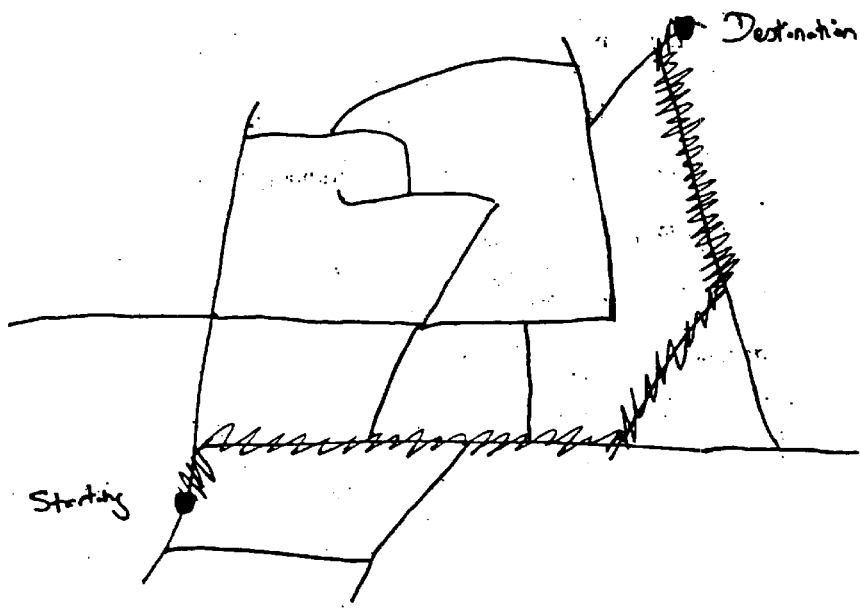

FIGS. 9A–9C together provide an example of how a driver may pre-configure the traffic monitoring service on a web site according to the second embodiment of the invention. In FIG. 9A, after providing a telephone number and a starting and destination location, a road map is provided of the relevant portion of the metropolitan area that includes the two locations. In this example, the driver chooses to receive information for the driver's chosen routes. FIGS. 9B and 9C illustrates the process of selecting two routes, named "Along Peachtree" and "Along Midtown," respectively. The routes are selected by "clicking" and "dragging" on portions of selected streets.

Figure 10A:
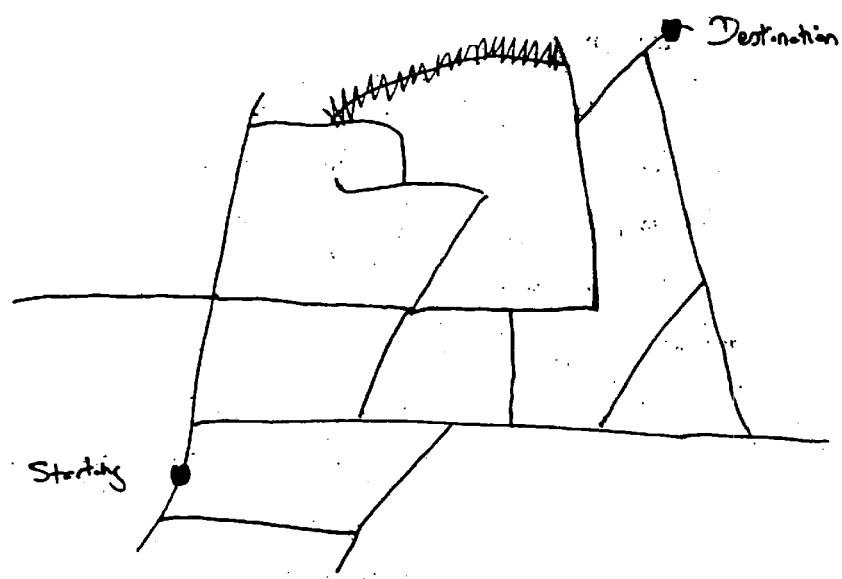
FIGS. 10A–10B are a series of exemplary screen shots for pre-configuring the traffic predicting system by identifying streets in accordance with the flow diagram of FIG. 8.
Figure 10B:
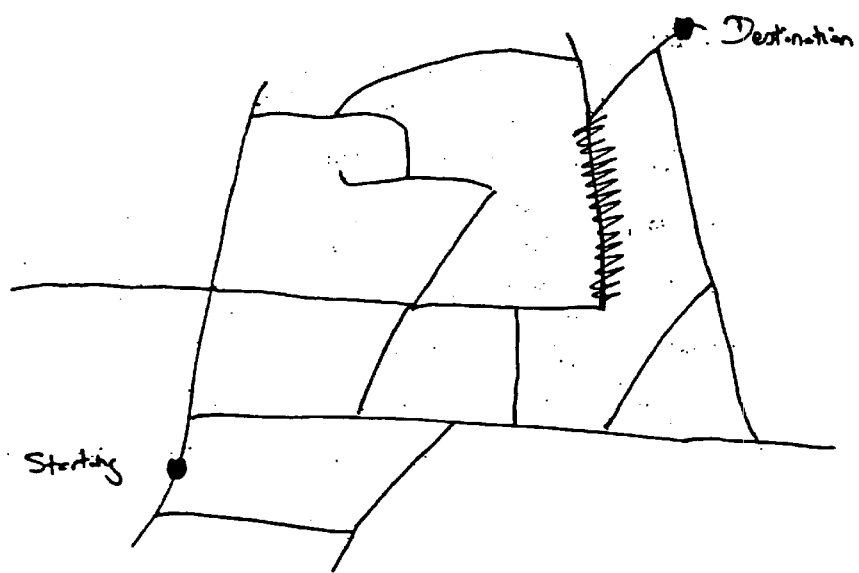

FIGS. 10A–10B, together with FIG. 9A, provide another example of how a driver may pre-configure the traffic monitoring service. In this example, the driver selects two streets to be monitored, named "Third Street" and "Jay Street," respectively.

Figure 11:
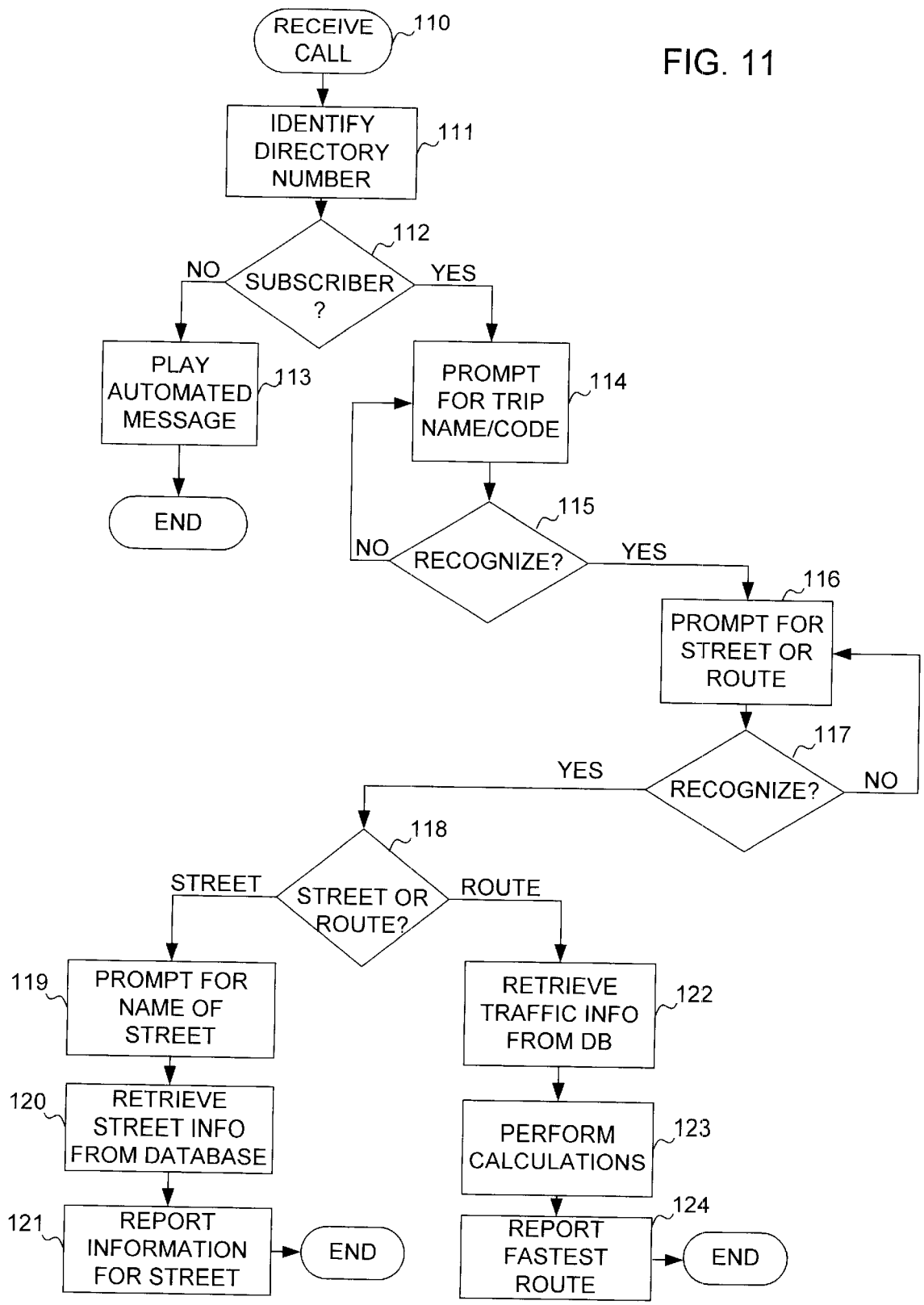
FIG. 11 is a flow diagram illustrating the steps for accessing traffic information using an automated system according to the second embodiment of the present invention.

When the driver is traveling, he can then call an administrative telephone number to access the automated traffic monitoring service and receive traffic information in accordance with the driving information provided during the pre-configuration on the web site. FIG. 11 is a flow diagram illustrating the steps for accessing traffic information using an automated system according to the second embodiment of the present invention.

Once a call is received at the traffic monitoring service, in step 110, the wireless directory telephone number is detected, in step 111. If the system determines that the caller is not a subscriber, in step 112, then an automated message is played over the caller's telephone, in step 113. If the caller is a subscriber, he is then prompted to provide the name or the code number for the trip that is in progress, in step 114. The subscriber can then press one or more keys on the wireless telephone, or simply speak the name. If the name is spoken, the system attempts to recognize the name using known speech recognition systems. Information pertaining to the subscriber's trips are stored and maintained in the subscriber database. If the name or code is recognized, in step 115, then the subscriber is prompted to indicate whether to search for information pertaining to a road or a comparison of one or more routes (e.g., "press '1' for streets, press '2' for routes . . . "). If this response is not recognized, in steps 117, then the system continues to prompt the subscriber for the appropriate command.

If it is determined in step 118 that the subscriber chooses to receive information about a particular street, then the system prompts the user to indicate the streetname by either speaking the name or pressing a code for the streetname, in step 119 ("press '1' for "Third Street;" press '2' for "Jay Street"). The information pertaining to which streets are associated with the subscriber is stored in the subscriber database. In step 120, the information pertaining to the identified streetname is retrieved from the traffic database. This information is then reported to the user through a simulated voice (e.g., "caution, Jay Street is running slowing with unusually heavy traffic, we suggest a different route if possible").

The subscriber may instead choose to compare the estimated travel times between a plurality of routes that were pre-configured and associated with the identified tripname. The system retrieves information from the traffic database for each street in each route, in step 122. The estimated travel time is calculated for each leg of the route, and the total travel time for each route is determined in step 123, in a manner as described with reference to FIG. 2. This information is then reported to the subscriber through a simulated voice (e.g., "take 'Along Peachtree,' it is the fastest route") in step 124. Thus, referring to FIGS. 9A–C and 10A–B, a subscriber can easily determine whether to take the "Along Peachtree" or "Along Midtown" routes, or to take or avoid either of "Third Street" or "Jay Street."

III. Short Messaging Service Embodiment

In a third embodiment, the driver pre-configures a traffic predicting system by providing information identifying the driver's preferred routes for reaching a destination, and optionally, the typical range of times when the driver is commuting. The information stored in the database is associated with the driver's wireless telephone number. When in use, short messages are provided over the display of the driver's associated wireless telephone during the range of times when the driver is commuting to advise the driver which of the preferred routes to choose. A significant difference between the Short Messaging Service embodiment and both the human intermediary embodiment and pre-programmed automated embodiment is that the driver receives requested information simply by turning on the driver's telephone, without having to make a telephone call.

Figure 12:
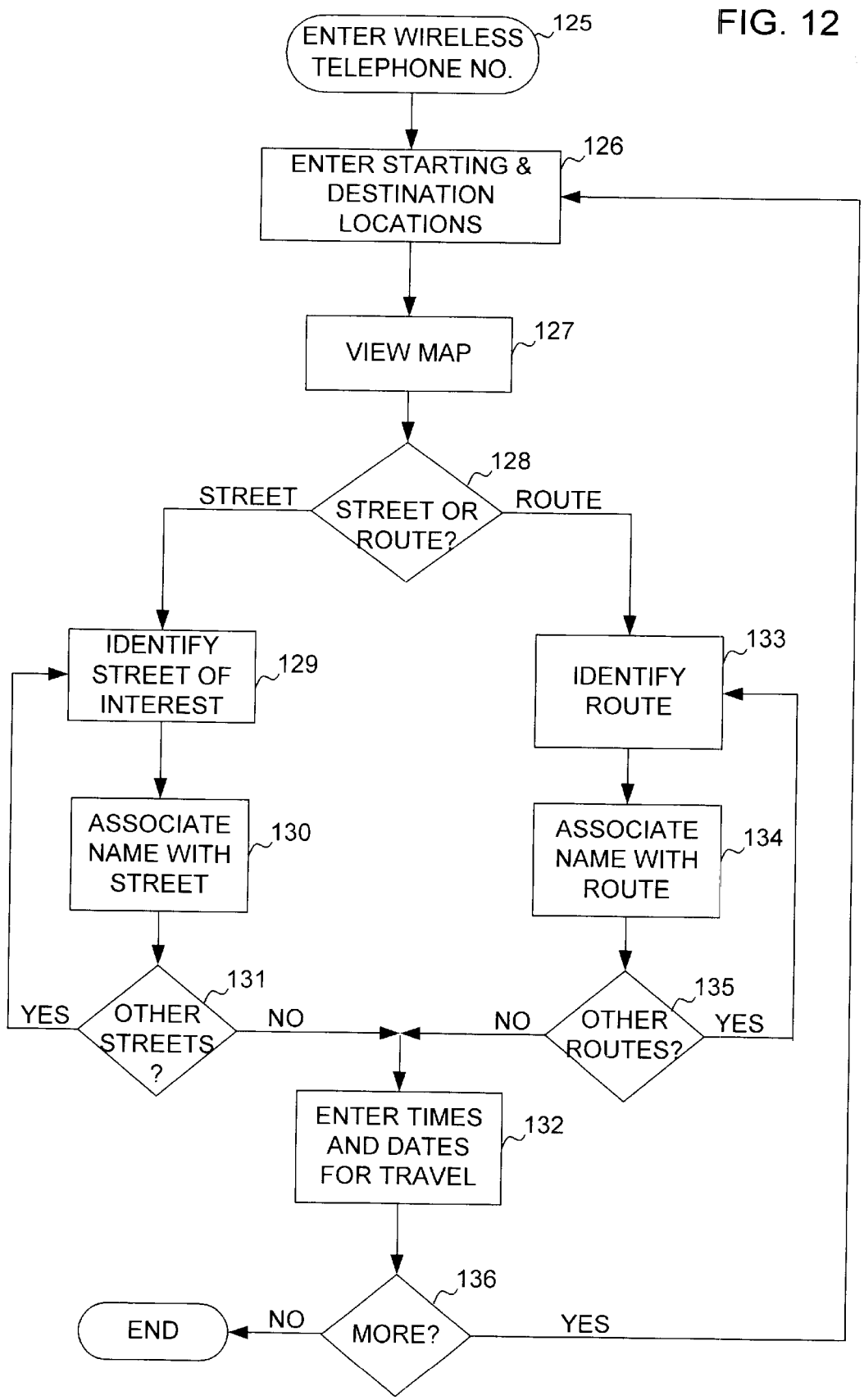
FIG. 12 is a flow diagram illustrating the steps for pre-configuring a traffic predicting system in a first exemplary implementation of a third embodiment of the present invention.

FIG. 12 is a flow diagram illustrating the steps for pre-configuring the traffic predicting system in a first exemplary implementation of the Short Messaging Service embodiment. As in FIG. 8, the web site requests the driver to first enter a wireless directory telephone number, in step 125, and a starting location and a destination location, in step 126. Optionally, if the service is associated with the driver's wireless network, it is possible that the web site will automatically detect the driver's wireless number upon receiving the driver's name. Once again, the driver then views a map in step 127, illustrating the starting and destination locations within the metropolitan area.

If the driver chooses in step 128 to receive information about a particular street, he identifies the street on the map in step 129 and selects a name for the street in step 130. In step 131, the driver then enters the anticipated range of times and day(s) of the week for travel (e.g., weekdays, weekends, or a particular day of the week). If in step 128, the driver chooses to receive information about which is the most efficient route, he then identifies a route in step 133, associates a name for the route in step 134, and repeats the process to enter other alternative routes for comparison. In this implementation, the driver may elect to receive information for other streets or routes in step 135.

FIG. 13 provides an example of an entry in the subscriber database pertaining to the traffic information that a particular subscriber has requested to receive by pre-configuring the traffic predicting system in accordance with the steps described with reference to FIG. 12. As is shown, the subscriber database stores the names of the particular streets and the times that the subscriber expects to be travelling on those streets (e.g., "Hallowell Dr., N., May 10, 2001: 0800"). The database also stores information pertaining to a plurality of routes between two locations to enable the system to determine the fastest route (e.g., "Along Cherry Valley" versus "Along Highway") considering the traffic conditions at the requested times (e.g., "8:00 am Weekdays"). The subscriber database automatically stores the number of miles for each leg of each route, and associates each street with a code for accessing the traffic database. At the time requested by the subscriber, or at regular intervals between the times provided by the subscriber if a time range is provided, the traffic predicting system performs a calculation as illustrated and explained with reference to FIG. 5 to determine the most direct route.

Figure 14:
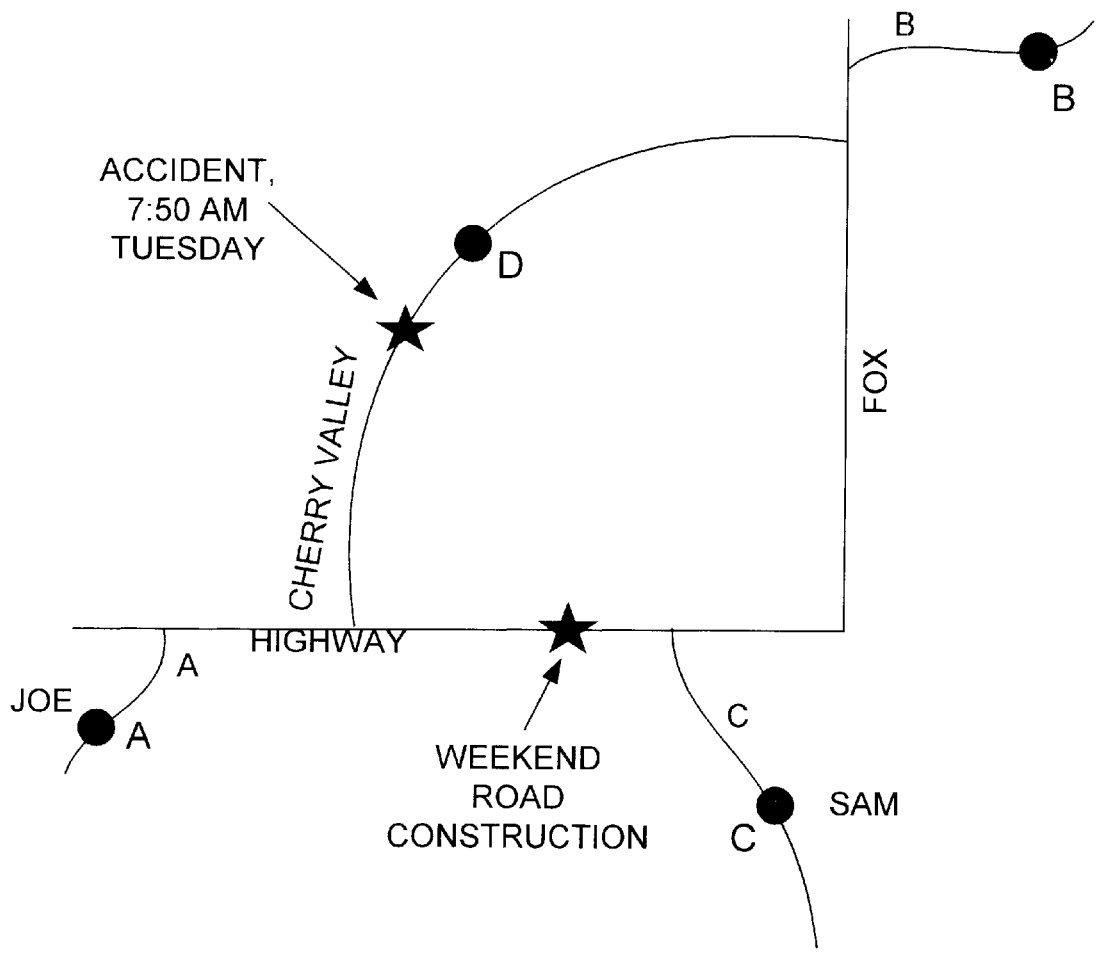
FIG. 14 is an exemplary map illustrating present and intended destination locations of two fictitious subscribers and certain traffic advisories that may affect the subscribers' commutes.

FIGS. 14 and 15 provide an example of how the short messaging service embodiment may be used. In this example, "Joe" and "Sam" are two fictitious drivers who subscribe to the service and have pre-configured the subscriber database with the following information: "Joe" intends to travel between points A and B at 8:00 am on weekdays (Monday through Friday) and prefers to travel by either taking the "Along Cherry Valley" route or the "Along Highway" route; and "Sam" intends to travel between points C and D at 12:00 pm on weekends, and desires to know the traffic conditions along "Highway" before deciding whether to take "Highway" or "Fox Street." FIG. 14 is a map of the region that includes the present and intended destination locations of Joe and Sam, and shows certain traffic advisories that may affect Joe and Sam's commutes. FIG. 15 is a schematic of a scheduling database that is accessed by the traffic data processors 10 in FIG. 1 to schedule the transmission of text messages to subscribers' wireless devices.

Continuing with this example, Joe leaves his home at point A at 7:55 am on Tuesday to begin his commute, and turns his cellular phone "on" while in his car. As can be seen in FIG. 15, entry number 5 in the scheduling database indicates that at 8:00 am on Tuesday, the system is to compare the traffic conditions on two specified routes and report which is the fastest of the two routes to Joe's telephone number at 555-1212. As shown on the map in FIG. 14, the system will detect that there is an accident that is slowing traffic on "Cherry Valley," and so the system will recommend that Joe should avoid the route that includes "Cherry Valley." Therefore, at 8:00 am, a short text message will be displayed on Joe's telephone that reads: "Along Highway," based upon the name of that route that Joe provided during the pre-configuration of the system.

Sam leaves his gym at point C at noon on Saturday to return home to point D, and also turns his cellular phone "on" while in the car. As can be seen in FIG. 15, entry number 6 in the scheduling database indicates that at noon on weekends, the system is to evaluate the traffic conditions on "Highway" and report the conditions to Sam's telephone number at 999-1234. The map shows that there is a road construction on "Highway," creating traffic congestion. This information is reported to Sam via a text message. Upon learning of the road construction, Sam can opt to take Fox Street back to his home to avoid the traffic.

There are several other exemplary implementations for utilizing a short text messaging service to report traffic information from a traffic database to a wireless subscriber. In a second exemplary implementation, the traffic reporting system transmits a plurality of short text messages to the wireless device at the time that the subscriber is beginning his commute, and the wireless device stores the messages that are received. Later, the subscriber can access the stored information by pressing different keys on the keypad of the wireless device. In this implementation, the subscriber database is pre-configured to include all of the information as provided in FIG. 13. However, in addition to, or instead of receiving a message recommending a particular route, the subscriber can receive a message pertaining to the traffic conditions for each different street in the route. The subscriber can then toggle through the messages at a safe, appropriate time (e.g., at a red traffic light) when the subscriber desires. Alternatively, the series of text messages can provide directions for the subscriber for the most direct route in light of the current traffic conditions. The subscriber can then cycle through the text messages to navigate the route, at a pace that is controlled by the subscriber.

In this second implementation, the text message that is transmitted to the subscriber's wireless device begins with header code that instructs the wireless device where to store (or whether to overwrite) the information in the device's RAM memory. Wireless devices easily can be designed to parse through the header of a short text message to detect a storage information code. The wireless device can also be programmable to press a certain button to remove the information from the device (e.g., "Clear") or alternatively, to save the information in the device's long term memory.

In a third implementation of the short messaging service embodiment, the traffic reporting system automatically reports traffic conditions for particular streets to a subscriber whenever the subscriber is beginning to approach or is in the vicinity of those streets. In this manner, it is unnecessary to store time and date information in the subscriber database shown in FIG. 13. Instead, a scheduling database maintains lists of subscriber telephones that are to receive text messages when approaching different cell sites. In other words, referring to the map as illustrated in FIG. 14, "Joe" may pre-configure the traffic reporting system to receive a traffic report whenever he approaches point "A." Anytime that Joe is approaching the cell site nearest point "A," it is likely that Joe is deciding whether to take the "Cherry Valley" bypass or instead travel along the "Highway." Regardless of the time or day, a short text message can help Joe by telling him if there are any traffic conditions on either road. If traffic is not an issue, Joe may opt to disregard the text message, or not turn on his wireless device at all. Although the third implementation may result in unnecessary or unneeded messages, it may be far simpler to administer, and may help subscribers learn of unpredictable accidents or road construction that may occur when the subscriber did not expect to encounter any traffic.

In a fourth implementation of the short messaging service embodiment, the wireless device includes a GPS receiver for tracking locations. In this example, traffic reporting system sends traffic information only when the subscriber reaches a certain location, which can be determined using the GPS receiver. As in the third implementation, the traffic reporting system will provide traffic information from the traffic database when the GPS receiver indicates that the driver is in close vicinity to the road, street, or highway in question. The reporting system also can be configured to only provide text messages to alert the driver of a traffic advisory ahead. In this mode, it may be unnecessary for the driver to pre-configure a subscriber database with any information.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. A traffic reporting system comprising:
   a) a subscriber database for maintaining subscriber account information including subscriber identification information, wherein the subscriber identification information includes a list of telephone numbers for each subscriber;
   b) a traffic information database for receiving updates of traffic information and storing the most recently received information; and
   c) a traffic information interface for providing traffic information from the traffic information database pertaining to a particular route or street to an identified subscriber in response to a particular request via a telephone call over a wireless network,
   wherein the system identifies a subscriber by comparing a calling number of the telephone call to subscriber identification information in the subscriber database, wherein if the caller is identified as a subscriber, the system provides traffic information to the subscriber, and if the caller is identified as a non-subscriber, the system plays an automated message and disconnects the telephone call.

2. The traffic reporting system according to claim 1, wherein the traffic information interface is operated by a human intermediary who receives requests for traffic information spoken by subscribers over a wireless network.

3. The traffic reporting system according to claim 1, wherein the traffic information interface provides traffic information based upon requests provided through responses to automated prompts by a subscriber using a wireless telephone.

4. The traffic reporting system according to claim 3, wherein the subscriber pre-configures the traffic information interface by providing a list of one or more streets or routes that are of interest to the subscriber.

5. The traffic reporting system according to claim 1, wherein the traffic information interface automatically transmits short text messages to particular subscribers based upon either the time or the geographical location of each subscriber.

6. The traffic reporting system according to claim 5, wherein subscribers pre-configure the traffic information interface by providing a list of one or more streets or routes that are of interest to the respective subscribers.

7. The traffic reporting system according to claim 6, wherein subscribers pre-configure the traffic information interface by additionally including one or more times to receive traffic information.

8. The traffic reporting system according to claim 5, wherein the traffic information interface provides information to subscribers based upon the respective subscribers' geographical location information as determined by GPS receivers.

9. The traffic reporting system according to claim 1, wherein the traffic information database receives updates of traffic information from at least one of road sensors, traffic cameras, traffic reports, and telephone callers.

10. A method for providing traffic information from a traffic database to a subscriber over a wireless network, comprising the steps of:
    a) receiving a telephone call from a caller's wireless telephone;
    b) detecting a telephone directory number of the wireless telephone; and
    c) determining whether the caller is a subscriber by comparing the telephone directory number to a list of current subscribers in a subscriber database,
    wherein if the caller is a subscriber, the method further comprises
    d) receiving the subscriber's present and intended destination locations to request traffic information, and
    e) calculating a most efficient route to travel between the locations, based upon traffic information stored in a traffic database, and
    wherein if the caller is not a subscriber, the method further comprises playing an automated message and disconnecting the telephone call.

11. The method for providing traffic information according to claim 10, wherein the present and intended destination location is provided by the subscriber in response to an automated voice prompt.

12. The method for providing traffic information according to claim 11, wherein the present and intended destination location is received by speech recognition.

13. The method for providing traffic information according to claim 10, wherein the most efficient route is calculated by performing the steps of:
    a) determining potential routes between the present and intended destination locations;
    b) selecting a predetermined number of the most geographically direct routes;
    c) generating street-by-street directions for each selected route;
    d) calculating the time required to travel each street within each route; and
    e) comparing the total times to travel each route.

14. A method for providing traffic information from a traffic database to a subscriber over a wireless network, comprising the steps of:
    a) receiving a telephone call from a caller's wireless telephone; and
    determining whether the caller is a subscriber by comparing the caller's wireless telephone number to a list of current subscribers in a subscriber database,
    wherein if the caller is a subscriber, the method further comprises
    b) receiving the subscriber's responses to one or more automated prompts;
    c) retrieving a starting and destination location from a subscriber database based upon the subscriber's responses; and
    d) calculating a most efficient route to travel between the locations, based upon traffic information stored in a traffic database,
    wherein if the caller is not a subscriber, the method further comprises playing an automated message and disconnecting the telephone call.

15. The method for providing traffic information according to claim 14, further comprising the steps of:
   e) retrieving a code name indicating the name of the most efficient route; and
   f) reporting the code name to the subscriber.

16. The method for providing traffic information according to claim 14, wherein the subscriber pre-configures the subscriber database by performing the steps of:
   a) entering a wireless directory telephone number;
   b) entering a starting and destination location;
   c) identifying at least two routes to travel between the locations; and
   d) identifying a code name for each route.

17. The method for providing traffic information according to claim 16, further comprising the step of identifying a name or code for the trip between the starting and destination location, wherein the subscriber pre-configures the subscriber database for a plurality of trips between different starting and destination locations.

18. The method for providing traffic information according to claim 17, wherein the subscriber identifies the trip in response to the automated prompts to receive an indication of the most efficient route from the plurality of routes entered into the subscriber database and corresponding to the particular trip, based upon current traffic information.

19. The method for providing traffic information according to claim 18, wherein the subscriber identifies the trip by depressing one or more keys on the subscriber's wireless telephone corresponding to the code for the trip.

20. The method for providing traffic information according to claim 18, wherein the subscriber identifies the trip by speaking the name of the trip corresponding to the trip name stored in the subscriber database, and wherein the name of the trip is recognized by speech recognition.

21. A method for providing traffic information from a traffic database to a subscriber over a wireless network, comprising the steps of:
   a) receiving a telephone call from a caller's wireless telephone; and
   determining whether the caller is a subscriber by comparing the caller's wireless telephone number to a list of current subscribers in a subscriber database,
   wherein if the caller is a subscriber the method further comprises
   b) receiving the subscriber's responses to one or more automated prompts;
   c) identifying a portion of a roadway based upon the subscriber's responses and information stored in the subscriber database; and
   d) retrieving traffic information for the portion of the roadway based upon information maintained in a traffic database, and
   wherein if the caller is not a subscriber, the method further comprises playing an automated message and disconnecting the telephone call.

22. The method for providing traffic information according to claim 21, further comprising the step of:
   e) reporting the traffic information to the subscriber by providing at least one of speed of travel information and traffic advisory information.

23. The method for providing traffic information according to claim 21, wherein the subscriber pre-configures the subscriber database by performing the steps of:
   a) entering a wireless directory telephone number;
   b) selecting a portion of a roadway; and
   c) identifying a code or name for the portion of the roadway.

24. The method for providing traffic information according to claim 21, wherein the subscriber identifies the portion of the roadway by depressing one or more keys on the subscriber's wireless telephone corresponding to the code for the portion of the roadway stored in the subscriber database.

25. A method for providing traffic information from a traffic database to a subscriber over a wireless network comprising the steps of:
   receiving a call from a caller's wireless telephone; and
   determining whether the caller is a subscriber by comparing the caller's wireless telephone number to a list of current subscribers in a subscriber database,
   wherein if the caller is a subscriber, the method further comprises
   a) detecting that the subscriber requested to receive traffic information at a present time;
   b) retrieving an indication of the traffic information requested by the subscriber from the subscriber database;
   c) retrieving the requested traffic information from a traffic database; and
   d) transmitting a short text message to be received on the subscriber's wireless telephone,
   wherein the requested traffic information is reported to the subscriber in the short text message, and wherein if the caller is not a subscriber, the method further comprises playing an automated message and disconnecting the call.

26. The method for providing traffic information according to claim 25, wherein the subscriber pre-configures the subscriber database by performing the steps of:
   a) entering a starting and destination location;
   b) identifying at least two routes to travel between the locations; and
   c) identifying a code name for each route,
   wherein the information entered into the subscriber database is associated with a telephone number of a wireless telephone of the subscriber.

27. The method for providing traffic information according to claim 26, wherein the subscriber additionally enters an estimated time and date of travel into the subscriber database.

28. The method for providing traffic information according to claim 27, wherein a subset of information entered into the subscriber database is entered into a scheduler database, which detects when to report particular traffic information to each respective subscriber.

29. The method for providing traffic information according to claim 26, wherein the method further includes automatically reporting traffic information when the subscriber's wireless telephone registers in a predetermined cellular location.

30. The method for providing traffic information according to claim 26, wherein the method further includes automatically reporting traffic information when the subscriber reaches a predetermined location as detected by a GPS receiver.

31. The method for providing traffic information according to claim 26, wherein the traffic information that is reported is an indication as to which of the at least to routes identified into the subscriber database is the most efficient route.

32. The method for providing traffic information according to claim 25, wherein the subscriber pre-configures the subscriber database by entering a first and second location along a roadway, wherein the information entered into the subscriber database is associated with a telephone number of a wireless telephone of the subscriber, and the traffic information that is reported is an indication of the traffic conditions between the first and second locations along the roadway.

* * * * *